Figure 1:
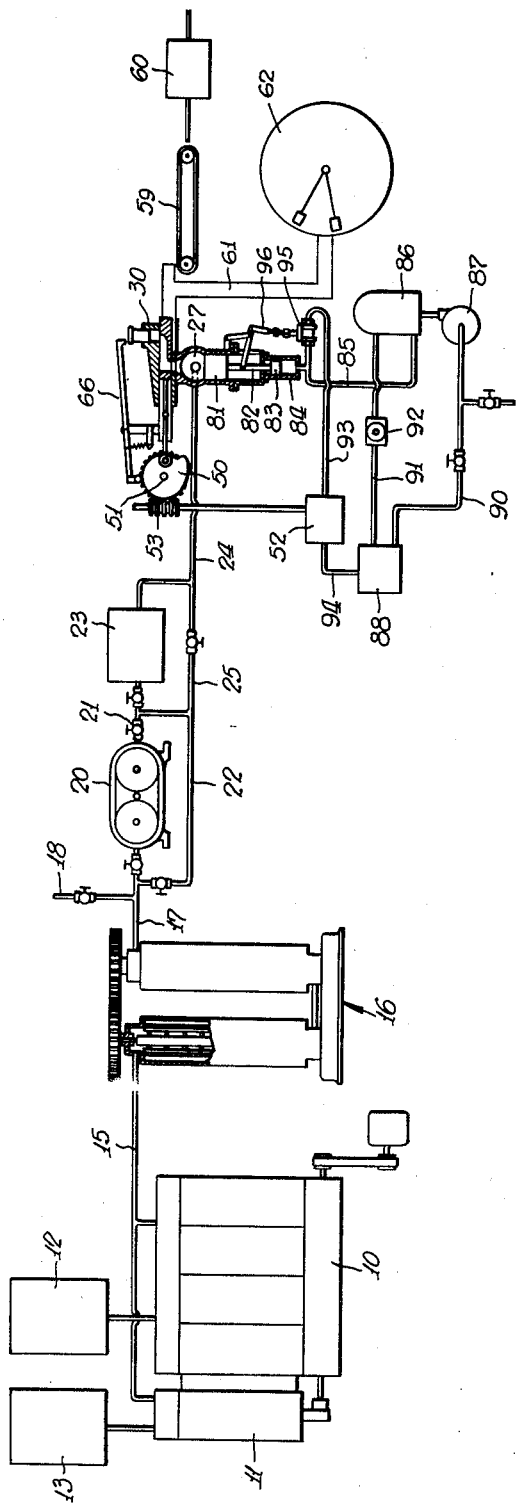

Sept. 14, 1943. B. DE H. MILLER 2,329,287
MOLDING OF MATERIALS
Filed Dec. 14, 1939 3 Sheets-Sheet 1

INVENTOR
Bruce de H. Miller
BY
Dean Fairbank & Hirsch
ATTORNEYS

Sept. 14, 1943.     B. DE H. MILLER     2,329,287
MOLDING OF MATERIALS
Filed Dec. 14, 1939     3 Sheets-Sheet 2
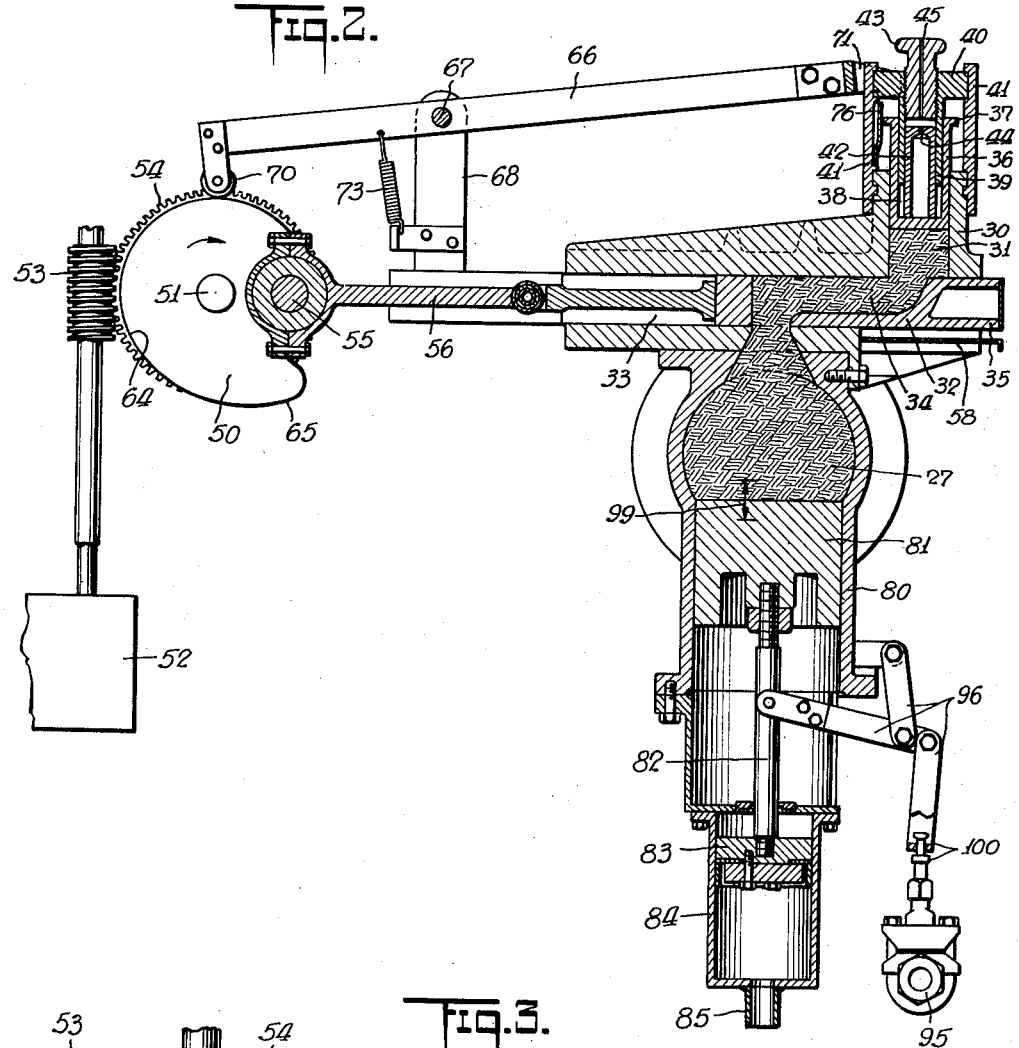
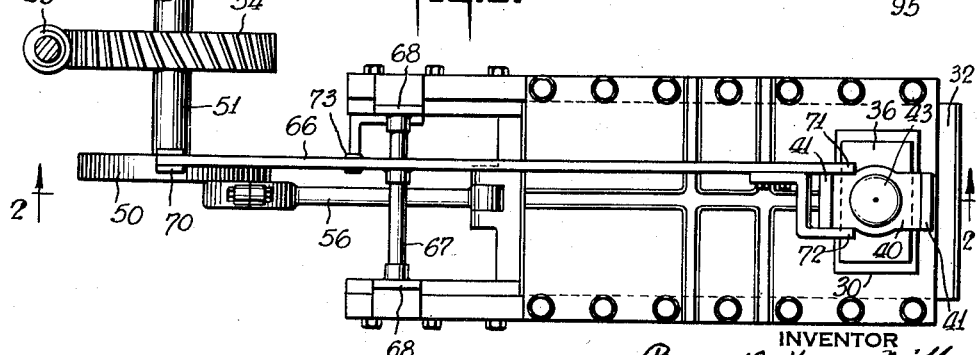
INVENTOR
Bruce De Havens Miller
BY
Dean Fairbanks Hirsch
ATTORNEYS Sept. 14, 1943.                B. DE H. MILLER                2,329,287
                              MOLDING OF MATERIALS
                           Filed Dec. 14, 1939          3 Sheets-Sheet 3
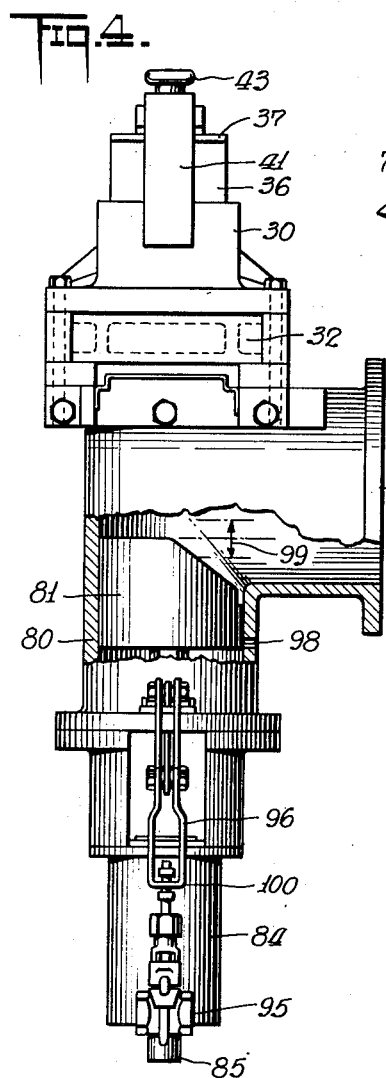
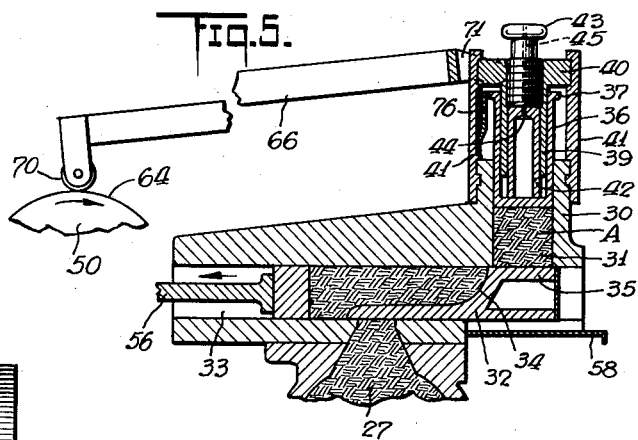
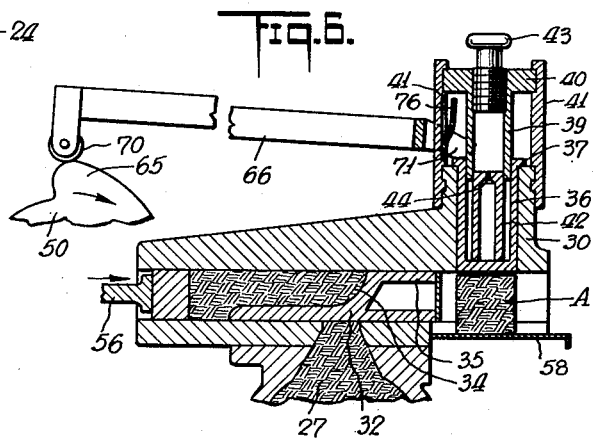
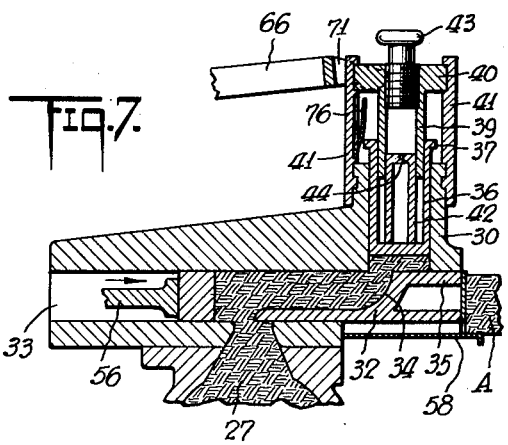
INVENTOR
Bruce De Haven Miller
BY
ATTORNEYS Patented Sept. 14, 1943

2,329,287

UNITED STATES PATENT OFFICE 2,329,287

MOLDING OF MATERIALS

Bruce De Haven Miller, Louisville, Ky., assignor to The Girdler Corporation, Louisville, Ky., a corporation of Delaware Application December 14, 1939, Serial No. 309,143

23 Claims. (Cl. 31—42)

This invention relates to methods and apparatus for processing and operating on materials, which after such processing have a plastic form suitable for molding into units of predetermined shape. Among the classes of materials which may be treated in accordance with this invention are soap, cheese, margarine, butter and the like.

One object of the invention is to provide a method and apparatus for continuously processing and molding materials in a completely closed system, so that no extraneous materials such as moisture, air, dust or the like can enter into said system.

Another object is to provide a processing system, in which all the operating steps, including that of molding into units of predetermined shape, will be conducted under a superatmospheric pressure, whereby the necessity for moving the material from one stage of operation to another by manual means is obviated.

Another object is to provide a method and means for molding and dispensing the processed material in a form suitable for subsequent packaging.

Another object is to provide a molding method and apparatus operated continuously, and automatically controlled by conditions existing elsewhere in the processing system.

Another object is to provide a new and improved molding device, which continuously molds accurate predetermined volumes of the material into predetermined shape, and which can be adjusted to form the material into units of selective size, weight and volume.

Another object is to provide a molding device adapted for continuous operation and involving no waste of the material being molded.

Another object is to provide a new combination of molder and processing apparatus, which enables the molding to be done in a continuous closed pressure system without making the previous processing steps dependent upon the subsequent molding step.

Various other objects and advantages of the invention will be apparent from the following particular description, and from an inspection of the accompanying drawings, in which:

Fig. 1 is a diagrammatic view partly in elevation, partly in plan, and partly in section, illustrating a complete processing system which may be used for carrying out the invention, Fig. 2 is a vertical section of a molding apparatus with associated control means, embodying the present invention, the parts being shown in the position they occupy at the conclusion of the mold filling stage, and before the molded mass has been severed from the flowing stream of material, Fig. 3 is a top plan view of the molding apparatus, Fig. 4 is a side elevation partly in section of the molding apparatus and its associated control means, and in a plane at right angles to that of Fig. 2, Fig. 5 is a vertical section of the molding apparatus similar to a portion of Fig. 2, but showing the parts in position at the end of the mold filling stage and after the molded mass has been severed from the flowing stream of material, Fig. 6 is a section similar to Fig. 5, but showing the parts in position after the molded mass has been ejected from the mold, and Fig. 7 is a section similar to Fig. 5, and showing the parts while the ejected molded mass is being conveyed towards a packaging station and the mold is refilling.

A complete system particularly useful in the manufacture of margarine, but having features applicable to the processing of other materials above referred to is shown somewhat diagrammatically in Fig. 1. This system comprises a pair of pumping devices 10 and 11, which force the material to be processed from supply tanks 12 and 13 continuously through the system at superatmospheric pressure, and which desirably constitute the only pressure source of the system, although suitable pressure boosters could be located at subsequent stages of the operation without departing from the scope of the invention.

In cases where the material to be processed includes a plurality of separate ingredients, the tanks 12 and 13 may serve to supply separately these ingredients, and the two pump sections 10 and 11 may function to proportion these ingredients in the desired ratios before discharge through a delivery conduit 15. Otherwise, a single supply tank and a single pump may be used.

The material is forced by the pumps 10 and 11 through the conduit 15 and into a suitable processing apparatus 16, which may be of the general type disclosed in Bottoms and Wood Patent No. 2,013,025, granted September 3, 1935, and which subjects the material under pressure to cooling and concurrent agitation before delivery to an outlet 17. As is obvious, suitable valves, controls and the like may be used on the apparatus handling the product before reaching the conduit 17. If additional ingredients are to be added to the material at this point, these may be delivered into the conduit 17 through a pipe 18.

The material, depending upon its nature, may pass from the conduit 17 through a mechanical blender 20 and into a conduit 21, or be by-passed around said blender through a conduit 22. Still, depending upon the nature of the material being processed, this material may pass from the conduits 21 or 22 either through a retention chamber 23, in which either or both special heat exchange and mechanical working may or may not take place, and then into a conduit 24, or through a by-pass line 25 into said conduit 24.

Assuming that the material being processed is for the manufacture of soap or margarine, this material, by the time it reaches the conduit 24, will have become sufficiently plastic to enable it to be molded, severed and dispensed, and will be under sufficient pressure to enable it to flow into the molding apparatus as will be described.

The plastic material under pressure flows from the conduit 24 into a chamber 27 of a control device to be described, and from there into the molding apparatus. This apparatus as shown in Fig. 2 comprises a mold casing 30, having a mold cavity 31 of a cross-section which corresponds to the desired cross-section of the molded units into which the plastic material is to be formed, and which in the specific form shown is rectangular. Controlling the flow of material between the control chamber 27 and the mold cavity 31 is a valve member 32, slidable in a valve casing 33, and provided with a passage 34, which when in one position establishes communication between the upper end of said chamber 27 and the lower end of the mold cavity 31 as shown in Fig. 2. In this position of the slide valve 32, the material under pressure flows from the control chamber 27 through the passage 34 and into the mold cavity 31.

The slide valve 32 at its forward end is formed with a head 35, which serves to close the open end of the mold cavity 31 when moved to the position shown in Fig. 5, and in moving to this position, it cuts off or severs the molded mass in the cavity 31 from the material in the valve passage 34 at predetermined controlled intervals as will be more fully described. The passage 34 also is out of communication with the chamber 27 in Fig. 5, but this is not essential.

The means for permitting the filling of the cavity 31 and for ejecting the molded unit therefrom is shown as a floating plunger 36, having a slide fit in the mold cavity 31, and provided at its outer end with a flange 37, which may seat on the top edge of the mold casing 30 at the end of the ejecting movement of said plunger as shown in Fig. 6 and will remain there until moved upwardly by the introduction of material into the mold cavity 31, and as will be more fully described. This plunger 36 which slides in the mold cavity 31 has a bore 38 with a sliding fit on a stationary sleeve or cylinder 39, having at its outer end a flange 40 secured to and extending between a pair of frame brackets 41. A plunger 42 is slidably mounted in the sleeve or cylinder 39, and its upward movement is limited by an adjustable stop 43 threaded through the flange 40. The plunger 42 at its lower end abuts the lower end wall of the plunger 36, so that by adjustment of the stop 43, the extent of outward movement of the plunger 36 is varied and the height of the mold unit formed in the cavity 31 is controlled.

The plunger 42 is desirably hollow and open at the lower end, and provided with a vent 44 in alignment with a bleeder passage 45 in the stop 43, so that air may enter and leave the plungers 36 and 42, but only at a slow rate, so that violent or sudden movements of the plungers are inhibited.

Means for correlating the movements of the slide valve 32 and the plunger 36 includes a shaft 51, driven from a motor 52 by means of a suitable reduction gearing as for instance a worm 53 and a wheel 54. The shaft carries a crank disc 50, having a crank pin 55 secured to a connecting rod 56, which latter is pivotally secured to the slide valve 32. Thus the slide valve 32 is moved cyclically into open position shown in Fig. 2, to permit flow of plastic material from the control chamber 27 into the mold cavity 31, and cause the floating plunger 36 to slide outwardly by the displacement action of this material. After this cavity has been filled to the limited position of the plunger 36, the slide valve 32 is moved toward the left, so that the valve head 35 closes the open end of the mold cavity, and shears off the molded material in the mold cavity 31 from the material in the passage 34 as shown in Fig. 5. Further movement of the slide valve 32 to the left from the position shown in Fig. 5 brings the valve head 35 beyond the open end of the mold cavity 31 as shown in Fig. 6, to permit the mold unit A in said cavity to be ejected onto a shelf 58 below said cavity by the action of the plunger 36 as will be described. Upon return movement of the slide valve 32 to the right, communication between the control chamber 27 and the mold cavity 31 will again be re-established through the valve passage 34 for the next successive mold filling phase of the operation as shown in Fig. 7. At the beginning of this filling operation, the plunger 36 was at the bottom of its stroke and the mold cavity was empty. As the material flows up into the cavity, the plunger is lifted by the material, and there is thus no opportunity for air to ever enter the cavity, and to cause a variation of weight, size or volume of the molded material. During the return movement of the slide valve 32, the end of the head 35 engages the molded block or unit A on the shelf 58, and pushes it forwardly onto a conveyor 59 (see Fig. 1) which delivers the unit to a packaging apparatus 60, or may push said block to a chute 61, which delivers the unit to a suitable rotary wrapping mechanism 62. After being wrapped and packaged, the mold unit A may then be taken to suitable storage places.

In order to move the plunger 36 into ejecting position and in time relationship with the movement of the slide valve 32, the crank disc 50 may be formed with a cam surface having a low circular portion 64 and a raised portion 65. A rocker arm 66 is pivotally mounted on a fulcrum 67 on a bracket 68, and carries at one end a roller 70 in follower engagement with the cam 50, and at the other end, a pair of spaced fingers 71 and 72 directly over the upper end of the plunger 36, and flanking the brackets 41.

The roller 70 is held on the cam by a spring 73, so that in mold filling position as shown in Fig. 2 with the cam follower 70 riding on the circular low part 64 of the cam 50, the fingers 71 and 72 are in elevated position to permit the plunger 36 to move outwardly under the displacement action of the material flowing into the mold cavity 31.

In outward limited position of the plunger 36, said plunger is desirably supported by some form of spring-pressed catch or resistance element 76, so that the plunger will not drop down and the molded unit will not drop out when the slide valve 32 moves from beneath said unit.

After the slide valve 32 has moved inwardly beyond the open end of the mold cavity 31, the cam follower 70, riding over the raised portion 65 of the cam 50, will cause the rocker arm 66 to move the fingers 71 and 72 into pushing engagement with the outer end of the plunger 36, so that the resulting inward movement of the plunger 36 will eject the severed mold unit A from the mold cavity 31 onto the shelf 58 as shown in Fig. 6. In limited ejecting position shown in Fig. 6, the flange 37 of the plunger 36 will seat on the outer edge of the mold casing 30, and the inner end face of said plunger will be flush with the open end of the mold cavity 31.

As soon as the high part 65 of the cam 50 passes beyond the cam roller 70, the rocker arm 66 under the action of the spring 73 is rotated counter-clockwise to release its pressure action on the plunger 36. At the same time, the slide valve 32 is moving to the right as shown in Fig. 7, and causing the face of the valve head 35 adjacent the plunger 36 to ride substantially flush with the lower end of said plunger, so that no air is trapped in the mold cavity 31 during this return movement of the slide valve to the right. Further movement of the slide valve 32 to the right will re-establish communication between the control chamber 27 and the mold cavity 31 through the valve passage 34, so that the plastic material under pressure flowing into the mold cavity 31 will move the floating plunger 36 upwardly for the next successive mold filling stage. Since no air is trapped in the mold cavity 31 as was previously described, the amount of material molded in said cavity in successive cycles will be the same.

The frequency of operation of the slide valve 32 and the plunger 36 is controlled automatically in accordance with the rate of delivery of the material delivered into the control chamber 27 and the resulting pressure created. The control means includes a cylinder 80 forming an extension of the control chamber 27, and having slidable therein a piston 81 which is rigidly connected to a second piston 83 in a hydraulic cylinder 84 by means of a rod 82. This cylinder 84 connects through a conduit 85 with a chamber 86 maintained under hydraulic pressure by a hydraulic pump 87. An open suction tank 88 is connected to the inlet side of the pump 87 by a line 90, and to the chamber 86 by a line 91 having an automatic pressure regulating valve 92 therein. The motor 52, which drives the shaft 51, is of the hydraulic type driven by hydraulic pressure from a line 93 connected to the line 85, and has its outlet connected to the suction tank 88 through a return line 94. A valve 95 in the line 93 controls the amount of fluid flowing to the motor, and therefore controls the speed of the motor. The valve 95 is automatically regulated by the pressure of the material in the control chamber 27. To effect this automatic regulation, a linkage 96 is provided between the valve stem of the control valve 95 and the piston rod 82.

The pressure of the material flowing into the control chamber 27 will be controlled by the setting of the valve 92, because the pump 87 continuously delivers liquid to the chamber 86, and the pressure in said chamber and therefore in the chamber 27 is kept constant. Upon increase in the rate of delivery of material to the chamber 27, the pistons 81 and 83 will move down against the constant pressure beneath the piston 83, and this will open the valve 95 to effect more rapid operation of the motor 52 and of the slide 32 to take care of the faster delivery to the chamber 27. Conversely, if the rate of delivery reduces, the piston 83 will move up and partially close the valve 95 and slow up the motor 52. The pressure on the material being molded remains constant, but the rate of molding operations is automatically varied in accordance with variations in the rate of delivery to the molder. As a safety measure, the cylinder may have a port 98 which will be uncovered by the piston to permit escape of the material in case of a sudden and large increase in the rate of delivery to chamber 27.

As the material is flowing into the chamber 27 at a normally constant rate and flows out to the mold cavity 31 intermittently, it will be evident that the amount of material in the chamber will fluctuate within limits, and that the pistons 81 and 83 will likewise move up and down for each cycle of the slide valve 32. The approximate limits of such movement is indicated by the arrow 99 in Fig. 2. As it is important that the motor 52 operate at a constant and uniform rate during such normal fluctuation of the amount of material in the chamber 27, there are provided lost motion connections 100 between the linkage 96 and the stem of the valve 95. If the piston 81 moves in either direction beyond the normal fluctuation limits, the lost motion will be taken up and the valve 95 moved toward wide open or toward closed position.

Although the motor 52 is shown as of the hydraulic type, this is merely one embodiment of the invention, because the motor may be an electric motor, in which case the control member 95 might be a rheostat controlling the speed of the said electric motor, and automatically regulated by the position of the piston 81, which position varies with variation in the rate of delivery of the material to the chamber 27. Also, the invention could be carried out by means of suitable mechanical elements and connections from any suitable source of power.

Although I have shown the slide valve controlling the admission to and discharge from a single mold cavity, it may control a plurality of them. Likewise, the mold cavities may be in the reciprocating or even in a rotary one and filled in succession as they move over a feed port.

My invention provides broadly a method whereby the rate at which the molded units are formed is automatically controlled in accordance with variations in the rate of delivery of the material operated upon. By means of the method and apparatus of molding, the operator is in no way compelled to subordinate the earlier stages of processing to the limitations of his molding and dispensing step as has heretofore often been the case. On the contrary, the molding operation is automatically accelerated or decelerated in accordance with changes in the rate of delivery of the processed material into the control chamber 27, but every unit produced is of the same controllable size and all are produced under the same predetermined pressure. In this way, the molding and severing apparatus becomes subordinate to the earlier stages of processing, thereby resulting in a more satisfactory operation.

As many changes could be made in the above method and apparatus, any many apparently widely different embodiments of this invention could be made without departing from the scope of the claims, it is intended that all matter contained in the above description or shown in the accompanying drawings shall be interpreted as illustrative and not in a limiting sense.

Having thus described the invention, what is claimed as new and desired to be secured by Letters Patent is:

1. An apparatus for molding plastic material continuously into units of predetermined size and shape, including a delivery conduit, a chamber for receiving material from said conduit, means automatically operative to afford substantial variation in the effective size of said chamber so as to provide for differences between the rate of delivery of material to said chamber and the rate of withdrawal of material therefrom, a mold, means for conducting a flow of plastic material into said mold under pressure from said chamber, means for severing the material in said mold from the main body of the material in said chamber, means for ejecting the severed mass of molded material from said mold, and means for rendering the operation of said severing and ejecting means dependent upon the volume of material in said chamber.

2. An apparatus for molding plastic material, including a chamber having an inlet for continuous delivery of material thereto under pressure and the effective size of which chamber is automatically variable over a substantial range so as to provide for differences between the rate of delivery of material to the chamber and the rate of withdrawal of material therefrom, means for forming plastic material into successive units of predetermined size and shape, means for delivering material into said forming means under pressure from said chamber, and means automatically operative to maintain the material in said chamber under predetermined substantially constant pressure.

3. An apparatus for molding plastic material, including a chamber having an inlet for continuous delivery of material thereto under pressure, means for forming plastic material into successive units of predetermined size and shape, means operative intermittently to provide a passage for flow of material into said forming means under pressure from said chamber, and to afford automatic variation in the effective size of said chamber in response to fluctuations in the volume of material in the chamber.

4. An apparatus for molding plastic material, including a chamber for receiving plastic material under pressure and having means operative to afford substantial variation in the effective size of the chamber in response to fluctuations in the volume of material in the chamber, means arranged to receive a flow of plastic material under pressure from said chamber and operable to form the material under such pressure into successive units of predetermined size and shape, means operative to maintain the material in said chamber under predetermined substantially constant pressure, and control means for rendering the operation of said forming means dependent upon the volume of material in said chamber.

5. An apparatus for molding plastic material, including a chamber for receiving plastic material under pressure, means for forming the plastic material into successive units of predetermined size and shape, means for conducting material under pressure from said chamber to said forming means, said chamber having a wall portion movable to afford automatic variation in the effective size of the chamber in response to fluctuation in the volume of material in the chamber, and means for pressing said wall portion inwardly under substantially constant pressure so as to impose substantially constant pressure on the material in the chamber.

6. An apparatus for molding plastic material, including a chamber for continuously receiving plastic material under pressure, means operable to form the plastic material into successive units of predetermined size and shape, means operable to conduct a flow of plastic material into said forming means under pressure from said chamber, said chamber having a movable wall portion pressed inwardly under predetermined substantially constant pressure so that the position of said wall portion and the effective size of said chamber vary automatically in accordance with variation in the volume of material in the chamber, and control means responsive to the position of said wall portion for rendering the operation of said forming means dependent upon the volume of material in said chamber.

7. A method for molding plastic material continuously into identical units of predetermined size and shape, which includes the steps of continuously delivering the plastic material to a completely filled automatically expansible and contractible chamber, maintaining the material in said chamber under substantially constant pressure, intermittently effecting flow of material under pressure from said chamber into a molding apparatus to fill the latter, intermittently discharging the units from the molding apparatus, and effecting automatic variation in the frequency of the mold filling and unit discharging operations in accordance with variations in the size of the expansible chamber.

8. An apparatus for molding plastic material continuously into units of predetermined size and shape, including a control chamber having a movable wall, means for delivering the plastic material under pressure to said chamber, means for shaping the plastic material into successive units of predetermined size and shape, means for intermittently delivering the plastic material under pressure from said control chamber to said shaping means, means for intermittently discharging the successive units from said shaping means, and means for controlling the frequency of operation of both of said delivering means and said discharging means automatically in accordance with the position of said wall.

9. An apparatus for molding plastic material into units of predetermined size and shape, including a control chamber having a piston, means for pressing said piston inwardly under constant pressure to maintain the material in said chamber under constant pressure and to permit variations in the effective capacity of said chamber, means for continuously delivering the material to said chamber, a molding device having a reciprocating member operating to permit delivery of the unit portions of the material from said chamber and the discharge of said units outside of said chamber, a motor for continuously operating said member, and means for controlling the speed of said motor in accordance with the position of said piston.

10. An apparatus for molding plastic material continuously into units of predetermined size and shape, including a control chamber having a movable wall, means for delivering the plastic material under pressure to said chamber, means for pressing said wall inwardly under substantially constant pressure, whereby the position of said wall varies with variations in the volume of material in said chamber, means for receiving the plastic material under pressure from said control chamber and for shaping the plastic material into successive units of predetermined size and shape, a source of power for operating said shaping means, a control member for controlling the speed of said source of power, and means responsive to the volume of the material in said control chamber for regulating said control member to correspondingly control the frequency of operation of said shaping means.

11. An apparatus for molding plastic material continuously into units of predetermined size and shape, including a control chamber of a capacity automatically varying in accordance with variations in the relative rates of delivery and withdrawal of material from said chamber, means for continuously delivering the plastic material under pressure to said chamber, a mold for shaping the plastic material into successive units of predetermined size and shape, means for intermittently effecting flow of plastic material into said mold under pressure from said control chamber, and means for controlling the frequency of operation of said last mentioned means in accordance with the volume of the material in said chamber.

12. An apparatus for molding plastic material, including a chamber of variable capacity, a mold, means for alternately establishing and terminating communication between said chamber and said mold, means for applying pressure to the material to effect continuous flow of the material under pressure into said chamber, and intermittently from said chamber into said mold to fill the latter, and means for varying the frequency with which said mold is filled and discharged to thereby maintain the amount in said chamber within predetermined limits.

13. An apparatus for molding plastic material, including a chamber of variable capacity, means for continuously delivering material to said chamber and maintaining the material in said chamber under a substantially constant pressure, a mold, means for alternately establishing and terminating communication between said chamber and said mold, whereby the pressure of material in said chamber causes the material to flow into and fill said mold while communication between them is established, and means controlled in accordance with the volume of material in said chamber for controlling the frequency of operation of said communication establishing means.

14. An apparatus for molding plastic material continuously into units of predetermined size and shape, including a control chamber of variable capacity having a wall automatically movable to effect increase and decrease in the capacity of said chamber, a mold, means for effecting the alternate filling of the mold from said chamber and the discharge of the molded unit from the mold, and means for controlling the frequency of operation of said last mentioned means automatically in accordance with the position of said wall.

15. An apparatus for molding plastic material into units of predetermined size and shape, including a stationary mold, a source of supply of plastic material, a slide valve having a passage for controlling communication between said mold and said source, and said valve having a portion movable to completely cover or completely uncover one side of said mold, a piston in said mold, means for moving said valve to permit filling of said mold from said source, and to advance a unit discharged from said mold, and means for operating said piston to discharge said unit when said valve is in position to completely uncover one face of the mold.

16. A molding apparatus including a chamber of variable capacity, a mold having a piston, means for subjecting the piston to fluid pressure to resist the movement of said piston during filling of the mold from said chamber, and resist increase in volume of said chamber, means for continuously supplying plastic materials to said chamber, means for intermittently establishing and terminating communication between said chamber and said mold.

17. A molding apparatus including a mold having an open side for the admission of plastic material and for the discharge of molded units, a plunger in said mold, means for limiting the movement of said plunger to control and limit the volumetric capacity of the mold, a chamber of variable capacity, means for continuously delivering said material thereto, means for alternately establishing and terminating communication between the open end of said mold and said chamber, and means for changing the relative rates of supply to and withdrawal of material from said chamber in accordance with the volume in said chamber.

18. An apparatus for molding plastic material into units of predetermined size and shape, including a stationary mold, a source of plastic material under pressure, a slide valve movable to alternately connect said mold with said source and to close communication with said source and completely uncover one side of the mold chamber, a piston in said mold movable to one limiting position by the material entering the mold when the valve is in position to connect the mold with said source, and means for forcing said piston to the opposite limiting position to discharge the unit when the valve completely uncovers one face of the mold, said valve operating to advance the discharged unit when moving to close said face of the mold and connect said mold with said source.

19. The method of subdividing plastic material into molded units, including continuously moving a body of said material under pressure into an expansible control chamber, periodically removing a predetermined volume of material from said chamber into a mold space expansible to a controllable predetermined limit, maintaining pressure upon said chamber for yieldingly resisting increases in volume thereof, and varying the rate of removal of material from said chamber in accordance with the volume of said chamber.

20. The method of producing molded units of plastic material, which includes the steps of processing the material under pressure to convert it to plastic condition, continuously delivering the plastic material under pressure to an expansible chamber, maintaining the material in said chamber under predetermined substantially constant pressure, alternately establishing and terminating communication between said chamber and a mold, whereby when communication is established the material enters and fills said mold by the action of the pressure maintained in said chamber, and ejecting the material from the mold when the latter is out of communication with said chamber.

21. The method of producing molded units of plastic material, which includes continuously delivering the plastic material under pressure to a chamber of variable capacity and maintaining the material under pressure, and intermittently discharging the material from said chamber into a mold, whereby the volume of material in said chamber fluctuates, and controlling the frequency with which said material is discharged from the chamber into said mold to maintain the volumetric content of material in said chamber within predetermined limits.

22. The method of forming units of readily flowable, substantially non-compressible material, which includes continuously delivering the material under pressure to a pressure chamber of variable capacity, intermittently withdrawing successive portions of predetermined volume from said chamber and discharging them as units of predetermined size, whereby the volume of material in said chamber decreases during withdrawal periods and increases during intermittent periods, and varying the frequency of the withdrawal periods to maintain the volumetric content of material in said chamber within predetermined limits.

23. In an apparatus for continuously operating on material, a closed conduit system, means for effecting flow of material through said system under superatmospheric pressure, means for processing material in a portion of said system in a manner to cause continuous delivery of material from said portion of the system in plastic form, means for forming the plastic material into successive units of predetermined size and shape in a subsequent portion of said system, a chamber connected in said system for continuously receiving material under pressure from said first mentioned portion of the system and for delivering material under pressure to said subsequent portion of the system, means capable of affording substantial variation in the effective size of said chamber in response to fluctuations in the amount of material in the chamber, and means for maintaining the material in said chamber under predetermined substantially constant pressure irrespective of such fluctuations.

BRUCE DE HAVEN MILLER.